The specification for this patent is not in print.
PATENTED FEB. 5, 1806.
657X
C. THOMPSON.
DELINEATING MACHINE.
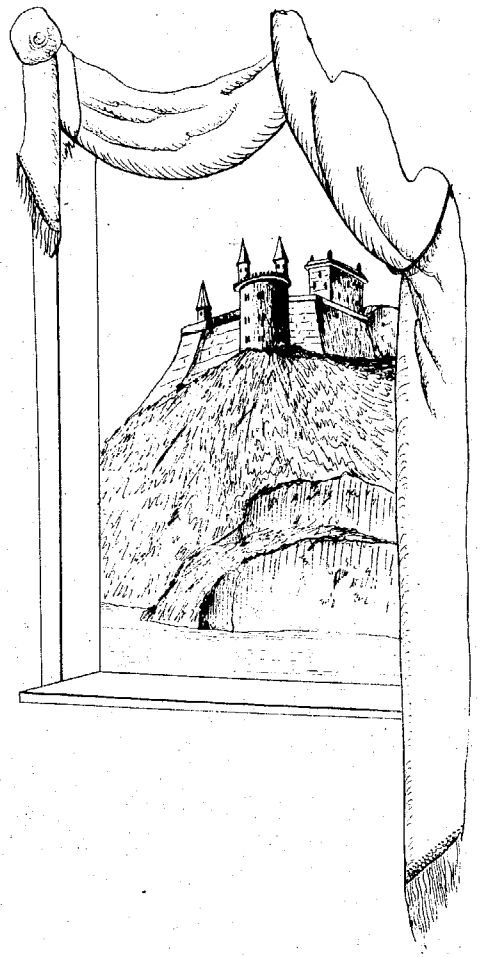
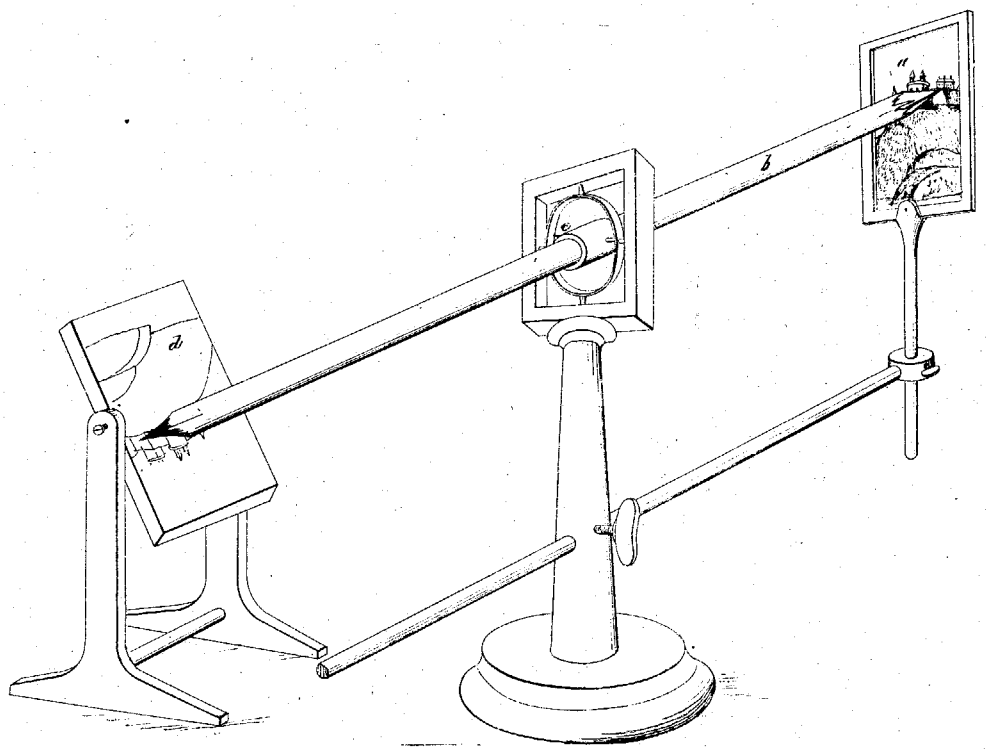

Feb 5, 1806

Cephas Thompson

Letters Patent. Issued Feb. 5. 1806.

The schedule referred to in these Letters Patent and making part of the same
containing a description in the words of the said Cephas Thompson himself of his
delineating machine for copying charts, Landscapes, paintings, profiles, &c. —

This machine in its principles and operation may be said to resemble the Eye
or Camera Obscura. the several pencils of light which are supposed to depict the
image of objects on the Retina are represented by a pencil of wood with a point
at each end; in the place of the cornea is an universal joint, through which
is fixed the artificial pencil. Like the image on the Retina all the drawn-
-ings effected by this machine are inverted copies of the originals. The delineator
may be used to great advantage by engravers, and painters in taking the outlines
of the painting intended to be copied upon the Plate, Canvass, or Paper. It may also
be used in taking profile likenesses; in tracing charts & pictures; in copying Landscapes
Buildings [illegible] &c. exactly from nature, and all at such sizes as the pleasure
of the artist may require Signed in the presence
of us. David A Leonard
Chas Collins Junr.

Cephas Thompson

[illegible]

Ex.
Chff.

[illegible] Drawing [illegible]